No. 747,905.  
PATENTED DEC. 22, 1903.  
C. E. CURTISS.  
SHREDDER HEAD.  
APPLICATION FILED SEPT. 18, 1902.  
NO MODEL.  
2 SHEETS—SHEET 1.

Witnesses  
Chas. J. O'Neill  
J. E. Hutchinson Jr.

Inventor:  
Charles E. Curtiss,  
by Seymour & Goldsborough  
Attys

No. 747,905. PATENTED DEC. 22, 1903.
C. E. CURTISS.
SHREDDER HEAD.
APPLICATION FILED SEPT. 18, 1902.
NO MODEL. 2 SHEETS—SHEET 2.

Witnesses:
Chas. J. O'Neill
J. E. Hutchinson Jr.

Inventor:
Charles E. Curtiss,
by Pennie & Goldsborough
Attys

No. 747,905.     Patented December 22, 1903.

UNITED STATES PATENT OFFICE.

CHARLES E. CURTISS, OF CHICAGO, ILLINOIS, ASSIGNOR, BY MESNE ASSIGNMENTS, TO INTERNATIONAL HARVESTER COMPANY, OF CHICAGO, ILLINOIS, A CORPORATION OF NEW JERSEY.

SHREDDER-HEAD.

SPECIFICATION forming part of Letters Patent No. 747,905, dated December 22, 1903.

Original application filed March 22, 1902, Serial No. 99,462. Divided and this application filed September 18, 1902. Serial No. 123,896. (No model.)

*To all whom it may concern:*

Be it known that I, CHARLES E. CURTISS, a citizen of the United States, residing at Chicago, in the county of Cook, in the State of Illinois, have invented certain new and useful Improvements in Shredder-Heads; and I do hereby declare the following to be a full, clear, and exact description of the invention, such as will enable others skilled in the art to which it appertains to make and use the same.

The invention relates to shredder-heads for corn husking and shredding machines into which the stalks are fed endwise between rolls which snap off the ears, which are passed onto corn-husking rolls, while the stalks are fed forward to a revolving cylinder provided with knives which slit or shred them longitudinally and also cut them up into small pieces suitable for feed for stock.

The object of the invention is to provide a shredder-head formed of a series of knives disposed about a rotary shaft and separated by intermediate washers that interlock with one another and are retained in position on the shaft by outwardly-flaring rims that serve the additional purpose of directing the material toward the center of the shredder-head, thereby preventing the winding of shreds, bands, &c., around the ends of the shaft.

This shredder-head is particularly designed and adapted for use in connection with corn husking and shredding machines of the type described and claimed in my application for Letters Patent filed March 22, 1902, Serial No. 99,462, of which application the present case is a division.

The invention is illustrated in the accompanying drawings, on which—

Figure 1:
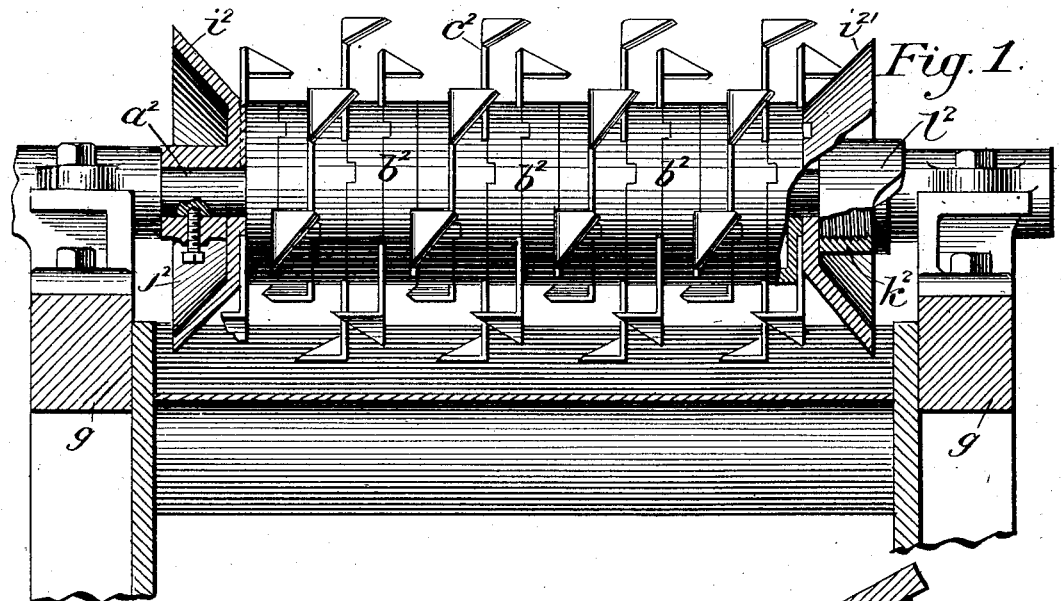
Figure 2:
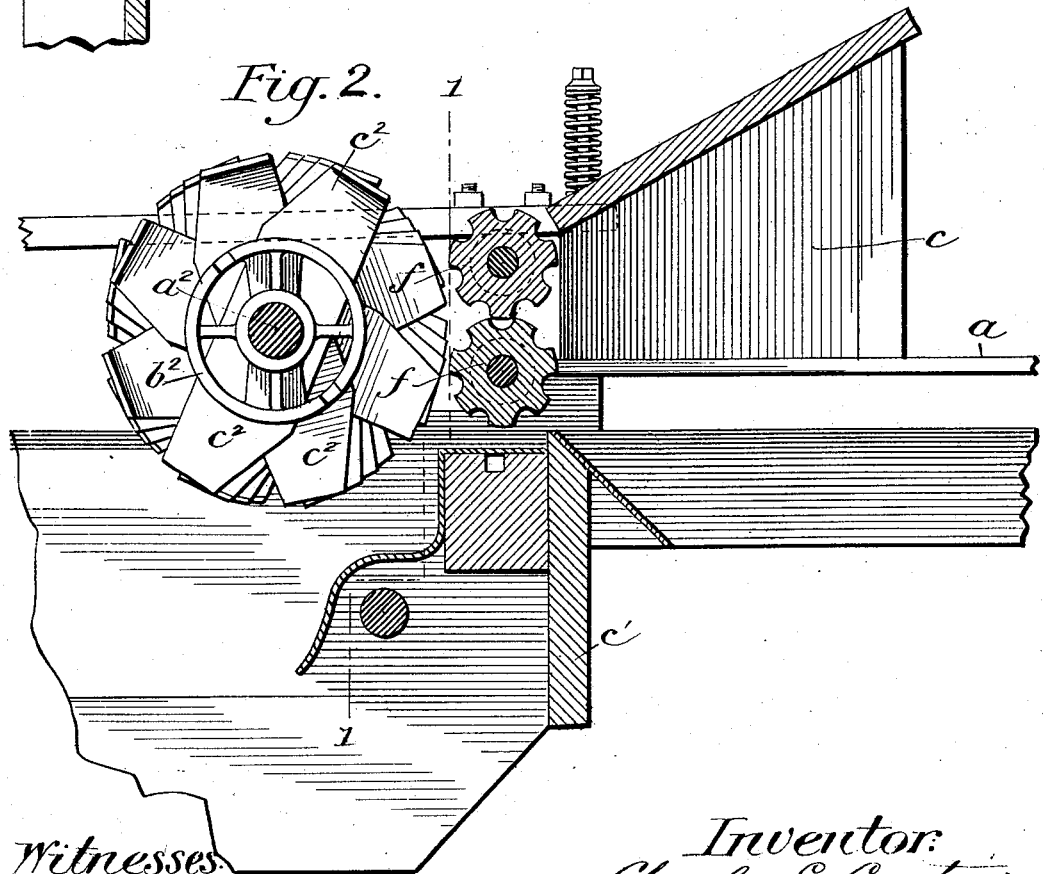
Figure 3:
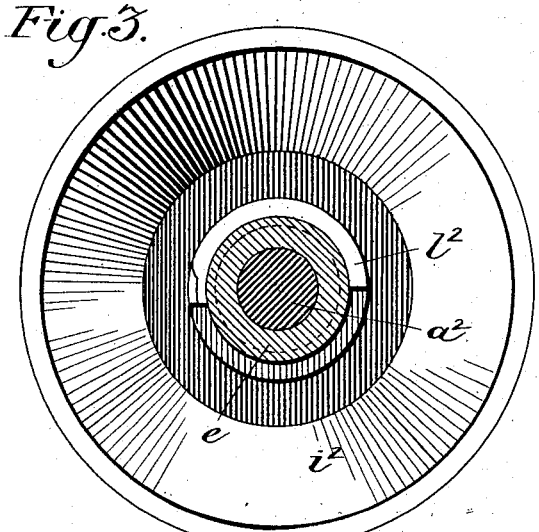
Figure 4:
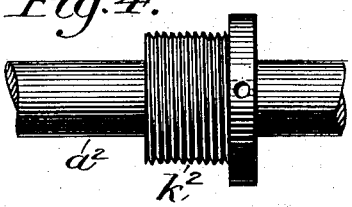
Figure 5:
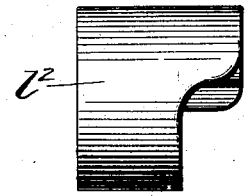
Figures 6, 7:
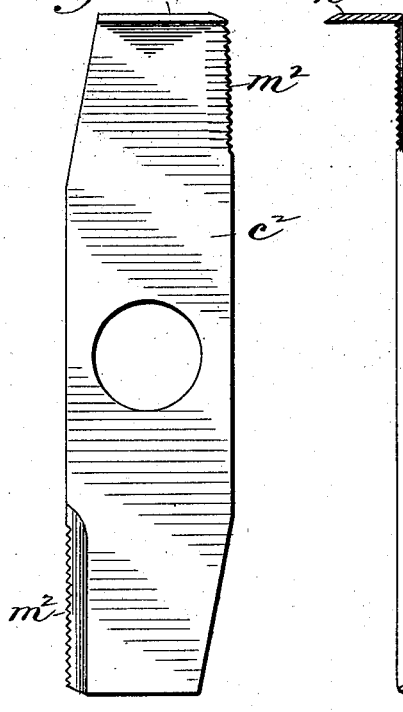
Figure 8:
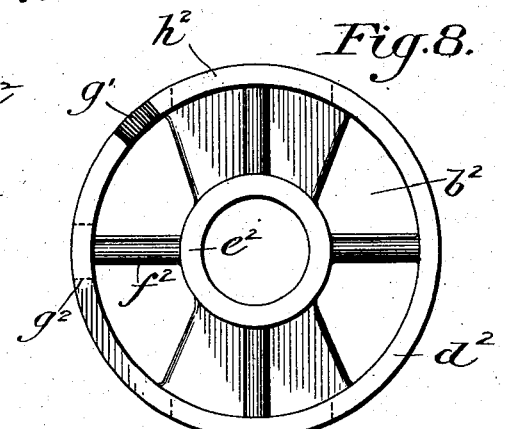
Figure 9:
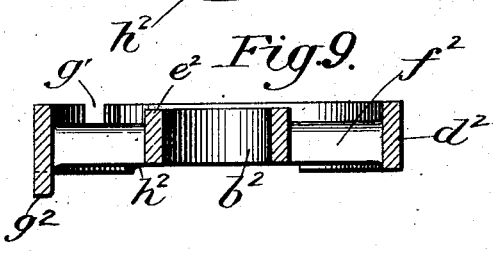
Figure 10:

Figure 1 is a section of Fig. 2 on the line 1 1, showing the shredder-head in position on the machine, a portion of the figure being broken away. Fig. 2 is a fragmentary view illustrating in section the mechanism shown in Fig. 1 with the snapping-rolls added. Fig. 3 is a detail of the end washer of the shredder-head. Fig. 4 is a detail of the end of the shredder-shaft. Fig. 5 is an elevation of the nut that holds the end washer on the shaft. Figs. 6 and 7 are side and edge views of one end of the shredder-knives. Fig. 8 is an edge view of one of the spacing-washers between the knives, and Fig. 9 is a diametrical section of Fig. 8. Fig. 10 is a plan view of one of the chopping-blades of the shredder-knives.

Referring to the drawings, the letter $a$ represents a table at the feed end of the machine, in front of which the operator stands and on which he pulls the stalks, whence they are delivered to the corrugated snapping-rolls $ff$ by way of the feed-chute $c$. The ears having been snapped off the stalks by the rolls $ff$, the stalks pass from said rolls to the shredder, which consists of a shaft $a^2$, having a plurality of interlocking cylindrical washers $b^2$ sleeved upon it and clamping between them at various radial angles projecting from the periphery of the shredder a number of knives $c^2$. As shown in Figs. 8 and 9, the washers have rims $d^2$, that are connected to hubs $e^2$ by means of spokes $f^2$. The rims are furnished with interlocking notches $g'$ and projections $g^2$ and are also notched, as shown at $h^2$, to receive the shanks or blades of the knives, which are set at uniform angles to one another, as best indicated in Fig. 2. The shredder-shaft is provided at one end with a flaring collar $i^2$ and at the other with a washer $i^{21}$ to prevent the wrapping of stalks, strings, or shreds around the shaft and clogging its action. The collar $i^2$ at one end of the shaft is fixed by a screw $j^2$, and the washer $i^{21}$ at the other end of the shaft abuts against the collar $k^2$, that is shrunk and pinned on the shaft and is threaded to receive a nut $l^2$, that holds the end washer fixed to the shaft and also makes solid the shredder-knives and interlocking washers, which latter also interlock with the collar $i^2$ and end washer $i^{21}$, as shown at $b^3$ and $i^4$, respectively.

In assembling the parts the nut $l^2$ is first screwed onto the fixed collar $k^2$. The end washer $i^{21}$ is then slipped on the shaft, and the spacing-washers are also slipped on and interlocked with the washer and one another, and the collar $i^2$ is then placed in position and fixed by the set-screw $j^2$. The nut $l^2$ is then screwed up tight against the end washer $i^{21}$, and the whole structure is thus made rigid with the shredder-shaft.

The construction of the shredder-knives is shown in Figs. 6, 7, and 10. They consist of flat double-ended steel-blades perforated at the center, so as to be slipped over the shaft $a^2$, and having each end serrated and sharpened, as at $m^2$, so that in the revolution of the shredder these radial edges will serve to slit or shred the stalks longitudinally. At their outer ends the blades are bent at right angles, as shown in Fig. 10, so as to chop up or cut the stalks crosswise into short pieces, and the bent ends $n^2$ are provided with inclined cutting edges that diverge at an angle to the plane of rotation of the edges $m^2$. The flaring rims of the end washer and collar are arranged to come close to the sides of the machine and have the important office of shedding any stalks, bands, or shredded fodder that may tend to wind themselves around the shredder-head at the ends, where the greatest difficulty from this cause would occur. The flaring rims also serve to guide the material toward the center to be acted on by the knives.

Such being the construction of my improved head, it is to be noted that the knives are held to the shaft only by being strung loosely thereon and clamped between the outer ends of the spacing-washers at some distance from the shaft, thus permitting knives with long light blades to be employed. It is also to be noted that the spacing-washers are held to the shaft only by being interlocked with the collar and end washer, as already described, and that they interlock with one another only at their outer rims, thus permitting the employment of skeleton light-weight washers without sacrificing strength or rigidity of construction.

Having thus described my invention, what I claim is—

1. The combination of the shredder-shaft, having the threaded collar $k^2$ near one end, the shredder-knives, the interlocking washers notched to receive the knives, the collars $i^2$ and $i^{21}$, and the nut $l^2$ screwing on the thread of the collar $k^2$.

2. A shredder-head comprising a shaft and radially-projecting knives, said knives being provided near their outer ends with cutting edges $m^2$, and the knives having also bent ends $n^2$ with inclined cutting edges that diverge at an angle to the plane of rotation of the edges $m^2$.

3. The combination of the shredder-shaft, the fixed collar $k^2$ at one end, the nut $l^2$ screw-threaded on the collar, the interlocking washers $b^2$, the shredder-knives clamped between the washers, the end washer $i^{21}$ adjacent the nut $l^2$, and the washer $i^2$ secured to the shaft at the other end.

4. The combination of the shredder-shaft, the fixed collar $k^2$ at one end having an exterior thread, the tubular nut $l^2$ inclosing the collar $k^2$, the end washer $i^{21}$ loose on the shredder-shaft and abutting against the end of the nut $l^2$, the interlocking spacing-washers $b^2$, the shredder-knives clamped between the washers, and the washer $i^2$ locked in fixed position to the end of the shaft opposite the washer $i^{21}$, the tubular nut $l^2$ being adjustably threaded upon the collar $k^2$ so as to tighten up the end washer $i^{21}$ and the intermediate spacing-washers $b^2$ against the fixed collar $i^2$.

In testimony whereof I affix my signature in presence of two witnesses.

CHARLES E. CURTISS.

Witnesses:
CHAS. N. CHAMBERS,
W. M. TWOMBLY.